United States Patent
Kume et al.

(10) Patent No.: US 11,302,189 B2
(45) Date of Patent: Apr. 12, 2022

(54) AGENT COOPERATION SYSTEM, AGENT COOPERATION METHOD, AND NON-TRANSITORY STORAGE MEDIUM

(71) Applicant: Toyota Jidosha Kabushiki Kaisha, Toyota (JP)

(72) Inventors: Satoshi Kume, Chofu (JP); Keiji Yamamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/241,231

(22) Filed: Jan. 7, 2019

(65) Prior Publication Data

US 2019/0221117 A1 Jul. 18, 2019

(30) Foreign Application Priority Data

Jan. 18, 2018 (JP) .............................. JP2018-006625

(51) Int. Cl.
| | | |
|---|---|---|
| G08G 1/0965 | (2006.01) | |
| G08G 1/16 | (2006.01) | |
| B60W 50/14 | (2020.01) | |
| H04W 84/00 | (2009.01) | |
| G08G 1/0967 | (2006.01) | |

(52) U.S. Cl.
CPC ........... *G08G 1/0965* (2013.01); *B60W 50/14* (2013.01); *G08G 1/161* (2013.01); *G08G 1/162* (2013.01); *G08G 1/167* (2013.01); *H04W 84/00* (2013.01); *G08G 1/096791* (2013.01)

(58) Field of Classification Search
CPC ...... G08G 1/0965; G08G 1/161; G08G 1/162; G08G 1/167; G08G 1/096791; B60W 50/14; H04W 84/00
USPC ................... 340/902, 933, 937, 425.5, 426.1
See application file for complete search history.

(56) References Cited

U.S. PATENT DOCUMENTS

| | | | |
|---|---|---|---|
| 2003/0028292 A1 | 2/2003 | Ueda | |
| 2005/0107944 A1* | 5/2005 | Hovestadt | G01C 21/3484 |
| | | | 701/423 |
| 2005/0256630 A1 | 11/2005 | Nishira et al. | |
| 2010/0036578 A1* | 2/2010 | Taguchi | B60K 31/0008 |
| | | | 701/93 |
| 2012/0095641 A1 | 4/2012 | Merk | |
| 2013/0204455 A1 | 8/2013 | Chia et al. | |
| 2013/0245882 A1 | 9/2013 | Ricci | |
| 2015/0019074 A1 | 1/2015 | Winter et al. | |
| 2015/0206434 A1 | 7/2015 | Shimotani et al. | |
| 2015/0353094 A1 | 12/2015 | Harda et al. | |
| 2016/0101783 A1 | 4/2016 | Abou-Nasr et al. | |
| 2016/0278065 A1* | 9/2016 | Kim | H04W 72/046 |

(Continued)

FOREIGN PATENT DOCUMENTS

| | | |
|---|---|---|
| DE | 102012001312 A1 | 8/2012 |
| DE | 102014205391 A1 | 9/2015 |
| DE | 102015116832 A1 | 4/2016 |

(Continued)

*Primary Examiner* — Daryl C Pope

(74) *Attorney, Agent, or Firm* — Dinsmore & Shohl LLP

(57) ABSTRACT

An agent cooperation system includes a first agent configured to acquire information on a driving attribute of a first driver in a first vehicle; and a second agent configured to notify a second driver in a second vehicle about driving assistance information derived based on the information on the driving attribute of the first driver acquired by the first agent.

11 Claims, 7 Drawing Sheets

(56) References Cited

U.S. PATENT DOCUMENTS

2017/0084174 A1 3/2017 Suzuki
2018/0308360 A1* 10/2018 Regmi ................. G08G 1/0965

FOREIGN PATENT DOCUMENTS

| JP | 2003-016584 A | 1/2003 |
| JP | 2003-050786 A | 2/2003 |
| JP | 2005-324727 A | 11/2005 |
| JP | 2007-316772 A | 12/2007 |
| JP | 2010-205147 A | 9/2010 |
| JP | 2012-022565 A | 2/2012 |
| JP | 2017-004397 A | 1/2017 |
| KR | 1020100107800 A | 10/2010 |
| WO | 2014054152 A1 | 4/2014 |
| WO | 2016/109540 A1 | 7/2016 |

* cited by examiner

| DRIVER ID | SEX | AGE | EXCESSIVE SPEED TENDENCY | RIGHT-OF-WAY YIELDING TENDENCY | OVERTAKING TENDENCY | ... |
|---|---|---|---|---|---|---|
| 001 | MAN | 40 | 64 | 57 | 55 | |
| 002 | WOMAN | 30 | 4 | 10 | 6 | |

AGENT COOPERATION SYSTEM, AGENT COOPERATION METHOD, AND NON-TRANSITORY STORAGE MEDIUM

CROSS-REFERENCE TO RELATED APPLICATION

This application claims priority to Japanese Patent Application No. 2018-006625 filed on Jan. 18, 2018, incorporated herein by reference in its entirety.

BACKGROUND

1. Technical Field

The present disclosure relates to an agent cooperation system, an agent cooperation method, and a non-transitory storage medium.

2. Description of Related Art

Japanese Patent Application Publication No. 2003-16584 (JP2003-16584 A) discloses an information terminal device that includes a host vehicle information acquisition unit for acquiring the host vehicle information including the position information and the speed information, a sending unit for sending the host vehicle information to another vehicle when a predetermined sending condition is satisfied, and a voice guidance unit for providing voice guidance concerning the other vehicle based on the position information and the speed information on the other vehicle acquired from the other vehicle. The voice guidance unit of this information terminal device informs the driver about the information on the other vehicle when the inter-vehicle distance between the host vehicle and the other vehicle exceeds a predetermined distance.

SUMMARY

According to the technique disclosed in Japanese Patent Application Publication No. 2003-16584 (JP2003-16584 A), the position information on another vehicle is acquired and the driver is notified about the information on the position of the other vehicle so that the host vehicle will not depart from the other vehicle. However, this technique is not intended to assist the host vehicle in driving in cooperation with the other vehicle, for example, when the host vehicle overtakes the other vehicle or when the host vehicle enters the lane in which the other vehicle is traveling.

The present disclosure provides a technique for notifying the driver about the information, obtained through cooperation among agents, to assist the driver in driving.

A first aspect of the disclosure provides an agent cooperation system comprising: a first agent configured to acquire information on a driving attribute of a first driver in a first vehicle; and a second agent configured to notify a second driver in a second vehicle about driving assistance information derived based on the information on the driving attribute of the first driver acquired by the first agent.

According to the first aspect, the agent cooperation system allows the second driver, who is notified about the driving assistance information derived based on the information on the driving attribute of the first driver, to drive based on this driving assistance information, thus aiding the second driver in driving.

In the first aspect, the first agent may be configured to generate the information on the driving attribute of the first driver based on a speech of the first driver.

In the first aspect, the second agent may be configured to notify the second driver about the driving assistance information derived based on a traveling schedule of the first driver, the traveling schedule of the first driver being estimated from the information on the driving attribute of the first driver.

In the first aspect, the first agent may be configured to identify information on future driving of the first driver, and the second agent may be configured to notify the second driver about the driving assistance information derived based on the driving attribute of the first driver identified by the first agent and on the information on the future driving of the first driver.

In the first aspect, the information on the driving attribute of the first driver may include a plurality of types of parameters, and the second agent may be configured to derive the driving assistance information based on at least one of the plurality of types of parameters and notify the second driver about the driving assistance information.

In the first aspect, the information on the driving attribute of the first driver may be updated by an action of the first driver responsive to the driving assistance information provided from the first agent.

The second aspect of the disclosure provides an agent cooperation method. The agent cooperation method includes: cooperating between a first agent mounted in a first vehicle and a second agent mounted in a second vehicle; acquiring, by the first agent, information on a driving attribute of a first driver in the first vehicle; and notifying, by the second agent, a second driver in the second vehicle about driving assistance information derived based on the information on the driving attribute of the first driver.

According to the second aspect, the agent cooperation method allows the second driver, who is notified about the driving assistance information derived based on the information on the driving attribute of the first driver, to drive based on this driving assistance information, thus aiding the second driver in driving.

The third aspect of the disclosure provides a non-transitory storage medium. The non-transitory storage medium stores information on a driving attribute of a first driver in a first vehicle, wherein the information is acquired by a first agent mounted in the first vehicle in a form of a plurality of types of parameters and is used in processing in which a second agent in a second vehicle notifies a second driver in the second vehicle about driving assistance information derived based on the information on the driving attribute of the first driver.

The fourth aspect of the disclosure provides an agent cooperation method. The agent cooperation method includes: cooperating between a first agent mounted in a first vehicle and a second agent mounted in a second vehicle; acquiring, by the first agent, information on a driving attribute of a first driver in the first vehicle; and sending the information on the driving attribute of the first driver to the second agent in such a way that the second agent can receive the information.

The fifth aspect of the disclosure provides an agent cooperation method. The agent cooperation method includes: cooperating between a first agent mounted in a first vehicle and a second agent mounted in a second vehicle; receiving information on a driving attribute of a first driver in the first vehicle acquired by the first agent; and notifying, by the second agent, a second driver in the second vehicle about driving assistance information derived based on the received information on the driving attribute of the first driver.

The above aspects provide a technique for notifying a driver about the information, obtained through cooperation among agents, to assist the driver in driving.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Figure 1:
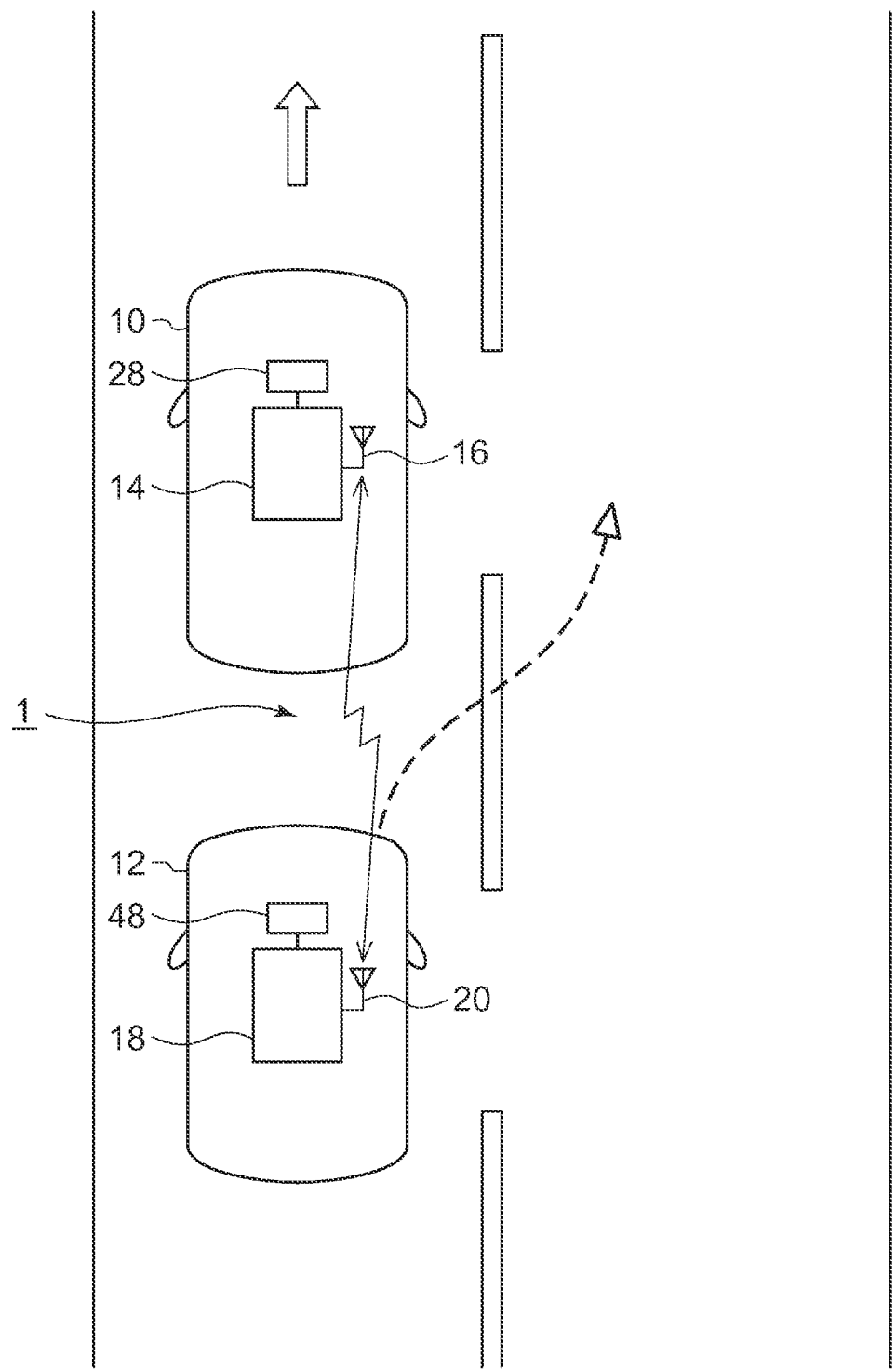
FIG. 1 is a diagram showing an agent cooperation system.
Figure 2A:
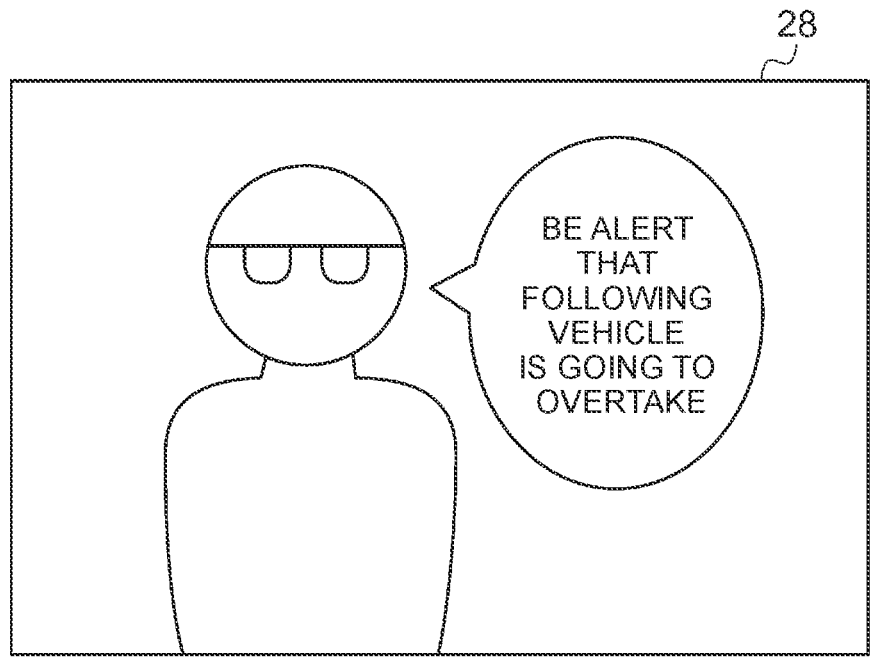
FIG. 2A is a diagram showing an example of information that an agent of one vehicle sends to a driver of another vehicle when the other vehicle overtakes the one vehicle.
Figure 2B:
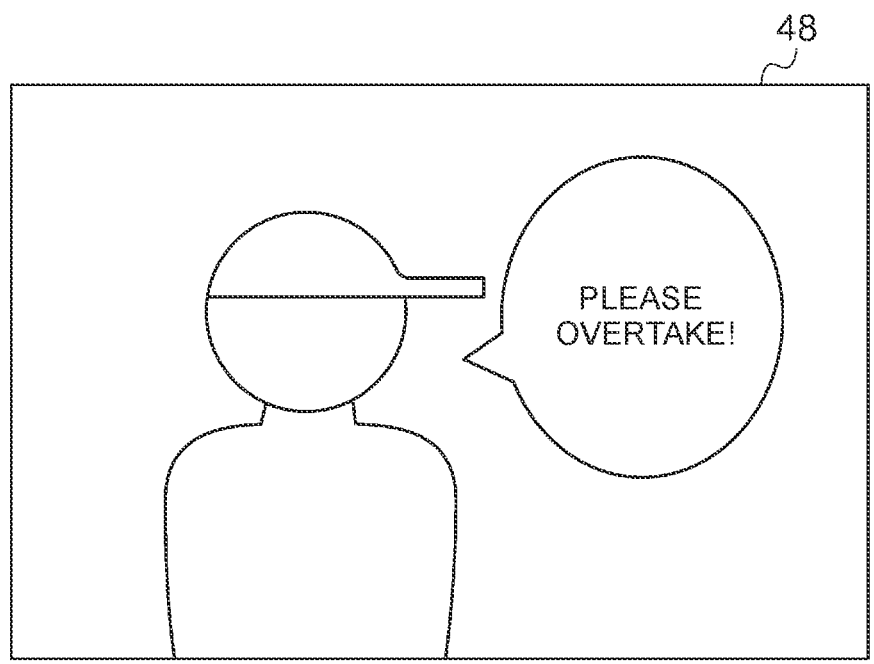
FIG. 2B is a diagram showing an example of information that an agent of one vehicle sends to a driver of another vehicle when the one vehicle overtakes the other vehicle.

FIG. 1 is a diagram showing an agent cooperation system 1. FIGS. 2A and 2B are diagrams showing an example of information that each agent sends to the driver when one vehicle overtakes another vehicle.

In the agent cooperation system 1, a first agent 14 mounted on a first vehicle 10 and a second agent 18 mounted on a second vehicle 12 cooperate with each other to exchange the information on the driving of each vehicle via a first communication unit 16 and a second communication unit 20. The information exchanged in this way is used for providing driving assistance. For example, the first agent 14 acquires the traveling schedule and the driving tendency of the second vehicle 12, located around the first vehicle 10, to notify a first driver in the first vehicle 10 about the driving assistance information useful for the first driver. Similarly, the second agent 18 acquires the traveling schedule and the driving tendency of the first vehicle 10 to notify a second driver in the second vehicle 12 about the driving assistance information useful for the second driver.

The first agent 14 and the second agent 18 exchange information with the drivers interactively in most cases to provide the traveling information via voice and/or image for assisting the drivers in driving. The first agent 14 and the second agent 18 may interact with the driver not only about traveling but also about daily things not related to traveling.

The first communication unit 16 and the second communication unit 20 exchange information by inter-vehicle communication using an infrared laser or a radio wave and/or by communication via a relay device such as a server device. A vehicle ID is assigned to each piece of information sent by the first communication unit 16 and the second communication unit 20.

In the situation shown in FIG. 1, the second driver in the second vehicle 12 speaks that the second vehicle 12 is going to overtake the first vehicle 10. Upon acquiring this speech, the second agent 18 sends the information on the future driving, which indicates that the second vehicle 12 is going to overtake the first vehicle 10, to the first agent 14 of the first vehicle 10.

The first agent 14 receives the traveling schedule of the second vehicle 12 and, as shown in FIG. 2A, notifies the first driver about the driving assistance information, which alerts that the second vehicle 12 is going to overtake the first vehicle 10, using a first transmission device 28 via voice and image. When the first driver speaks, in response to the notification from the first agent 14, that overtaking by the second vehicle 12 is allowed, the first agent 14 sends the information on the future driving of the first driver, which indicates that overtaking is allowed, to the second agent 18. Upon receiving this information, the second agent 18 notifies the second driver about the driving assistance information, which indicates that the second vehicle 12 may overtake the first vehicle 10, using a second transmission device 48 via voice and image as shown in FIG. 2B.

In another method, the first agent 14 receives the information, which indicates that the second vehicle 12 is going to overtake the first vehicle 10, from the second agent 18 and, in response to this information, sends the information indicating the driving attribute of the first driver to the second agent 18. Based on the information indicating the driving attribute of the first driver, the second agent 18 determines whether smooth overtaking is possible. If it is determined that smooth overtaking is possible, the second agent 18 notifies the second driver about the driving assistance information, which indicates that the second vehicle 12 may overtake the first vehicle 10, using the second transmission device 48 via voice and images as shown in FIG. 2B.

In any of the methods described above, the first driver receives the notification of the driving assistance information indicating the traveling schedule of the second vehicle 12 and, based on this notification, can drive carefully while taking care not to change the lane and not to increase the vehicle speed. Similarly, the second driver receives the notification of the driving assistance information determined based on the future driving of the first vehicle 10 and, based on this notification, can overtake the first vehicle 10 smoothly. In this way, cooperating between the agents makes it possible to assist the drivers in driving.

Figure 3:
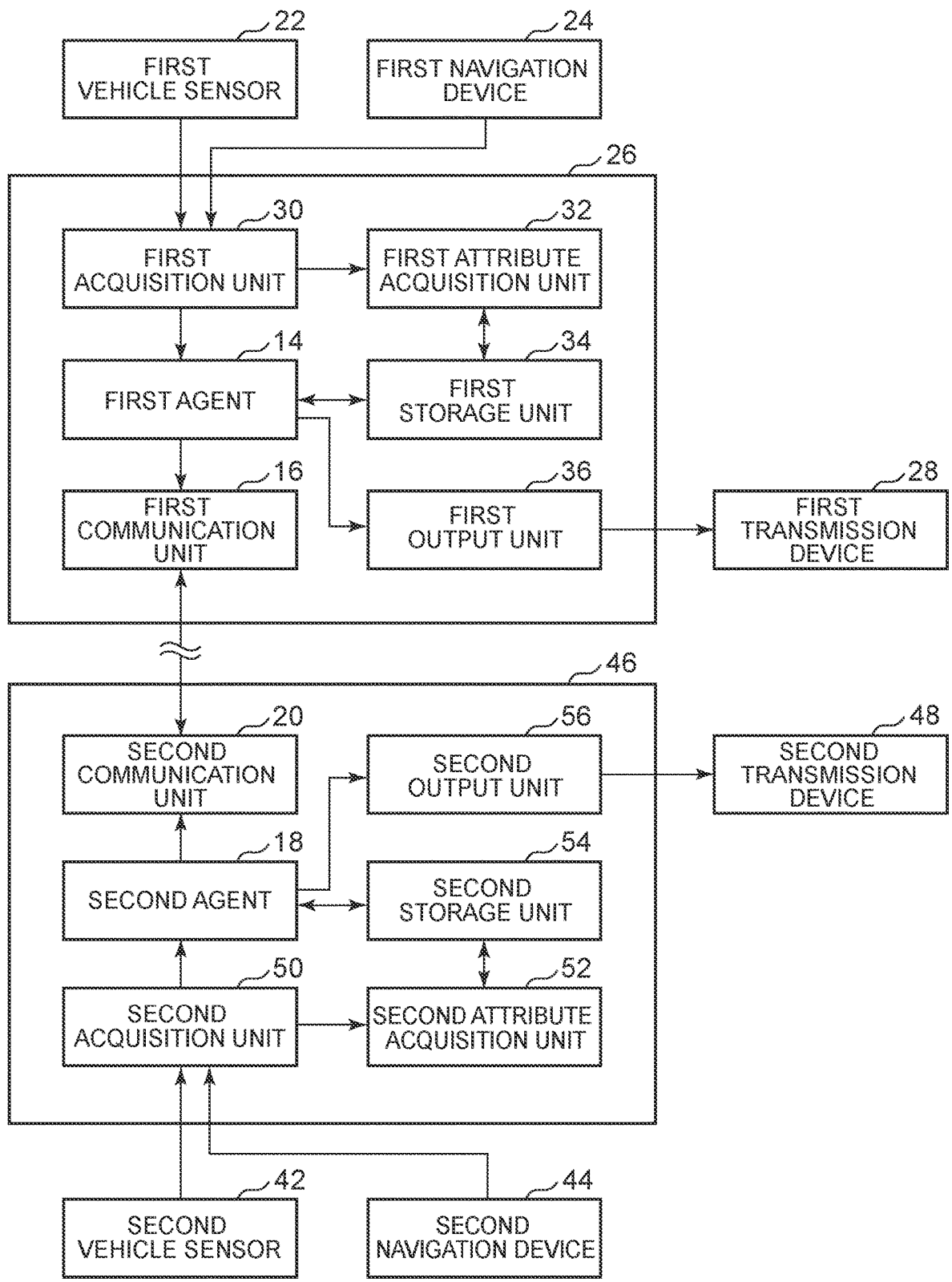
FIG. 3 is a diagram showing a functional configuration of the agent cooperation system.

FIG. 3 is a diagram showing a functional configuration of the agent cooperation system 1. The components shown in FIG. 3 as functional blocks, which perform various processing, can be implemented each by a circuit block, a memory, and another LSI on a hardware basis, and by a program loaded into the memory on a software basis. Therefore, it is understood by those skilled in the art that these functional blocks can be implemented in various forms by hardware only, by software only, or by a combination of hardware and software. That is, the implementation of these functional blocks should not limited to one of them.

The first vehicle 10 is provided with a first vehicle sensor 22, a first navigation device 24, a first control unit 26, and the first transmission device 28. The first vehicle sensor 22 includes various sensors provided in the first vehicle 10, such as a sensor for detecting the external environment, a sensor for detecting the traveling state, and a microphone for acquiring a driver's speech.

The sensor for detecting the external environment includes a camera for capturing the surroundings of the vehicle and a radar and a laser for detecting an object around the vehicle. Based on the detection result of these sensors, the position information on another vehicle around the host vehicle can be acquired. The sensor for detecting the traveling state includes a sensor for detecting the vehicle speed, a sensor for detecting the acceleration, a sensor for detecting the steering operation amount, and a sensor for detecting the braking operation amount. Based on the detection result of these sensors, the traveling result of the vehicle can be acquired for calculating the driving tendency of the driver. The information acquired by the first vehicle sensor 22 is sent to the first control unit 26.

The first navigation device 24 acquires the information indicating the destination, which is set by the driver, and the position information on the first vehicle 10, and sends the destination information and the position information to the first control unit 26. The first transmission device 28, which includes a display and a speaker, sends the information to the driver under the control of the first control unit 26.

The first control unit 26 includes the first agent 14, the first communication unit 16, a first acquisition unit 30, a first attribute acquisition unit 32, a first storage unit 34, and a first output unit 36. The first acquisition unit 30 acquires the external environment information, traveling state information, speech information, destination information, and position information from the first vehicle sensor 22 and the first navigation device 24.

The first attribute acquisition unit 32 acquires the driving tendency of a driver based on the traveling state information acquired by the first acquisition unit 30. The first attribute acquisition unit 32 classifies driver's driving behaviors into a plurality of levels depending upon whether the driver drives gently or roughly based on traveling state information indicating the past driving history. Then, the first attribute acquisition unit 32 stores the classified information, which indicates the gentleness of driving, in the first storage unit 34 as the driving tendency.

The first storage unit 34 stores the information indicating the driving tendency of a driver, as well as the personal information indicating the sex and age of the driver, as the information on the driving attribute of the driver. The information on the driving attribute of the driver includes the attribute information on the driver and the information indicating the driving tendency. In addition, the first storage unit 34 stores the map information.

The first output unit 36 generates image and voice signals to be sent to the first transmission device 28 according to the determination by the first agent 14 and sends the generated information to the first transmission device 28 to provide the driver with the information.

The first agent 14 cooperates with the second agent 18 of the second vehicle 12 to provide the driving assistance information, using the external environment information, traveling state information, speech information, destination information, and position information, acquired by the first acquisition unit 30, and the driver's driving attribute information stored in the first storage unit 34.

The second vehicle 12 is provided with a second vehicle sensor 42, a second navigation device 44, a second control unit 46, and the second transmission device 48. The second control unit 46 includes the second agent 18, the second communication unit 20, a second acquisition unit 50, a second attribute acquisition unit 52, a second storage unit 54, and a second output unit 56. Since each of the functions provided in the second vehicle 12 is the same as that of the first vehicle 10, the description will be omitted.

Figures 4, 5:
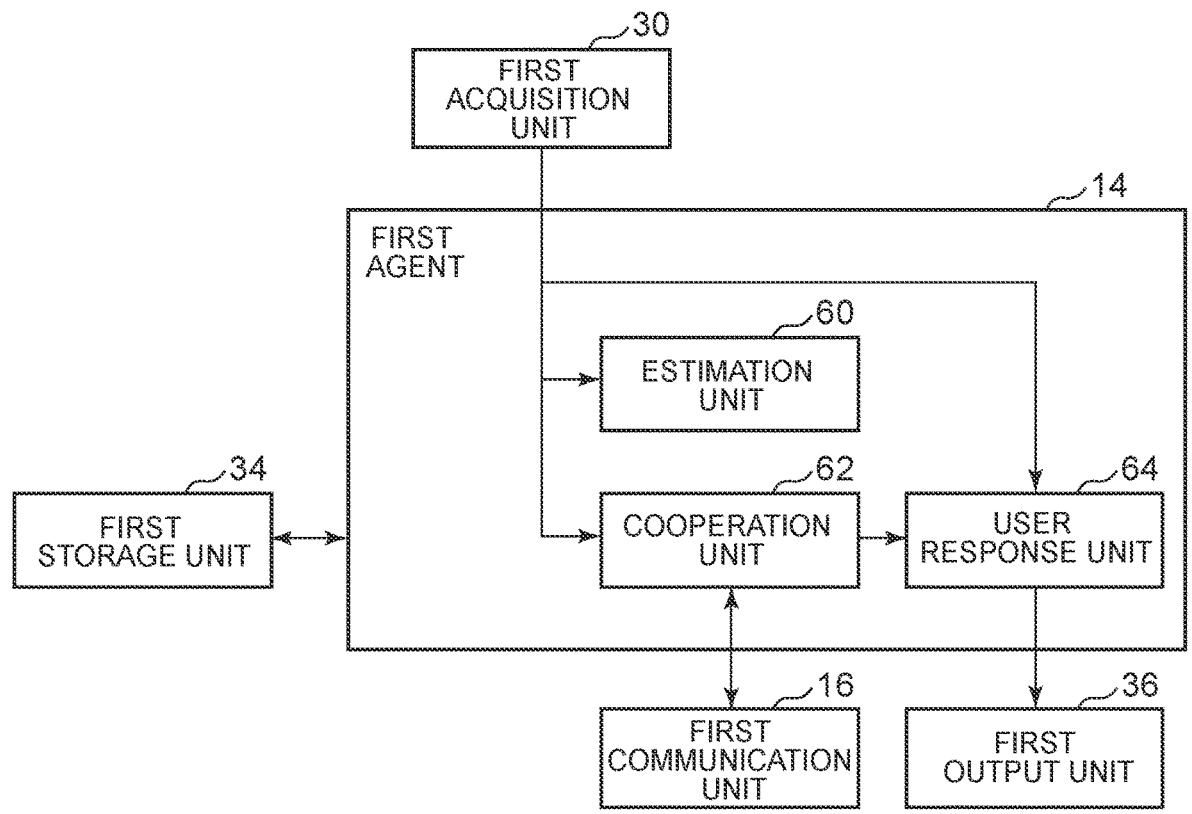
FIG. 4 is a diagram showing a functional configuration of a first agent.
FIG. 5 is a diagram showing the information on the driving attribute of drivers.

FIG. 4 is a diagram showing a functional configuration of the first agent 14. The first agent 14 has an estimation unit 60, a cooperation unit 62, and a user response unit 64.

The user response unit 64 recognizes a speech of the first driver and responds to the speech for communicating with the driver. The user response unit 64 not only responds to a speech of the first driver but also outputs a voice message that prompts the first driver to speak or provides the first driver with the driving assistance information. For example, the user response unit 64 outputs the voice message "Where are you going?" to prompt the first driver to speak on the destination or, based on the vehicle speed information, outputs the voice message "Drive with reduced speed" for providing driving assistance.

The user response unit 64 updates the information on the driving attribute of the first driver based on the speech of the first driver. For example, the user response unit 64 identifies the sex, age, and nature of the first driver from the speech of the first driver and stores the identified information in the first storage unit 34 as the driving attribute of the first driver. The user response unit 64 can acquire the information on the driving attribute of the first driver, which is not the driving data, by analyzing the speech of the first driver.

There may be a plurality of types of information on the driving attribute of a driver. For example, the driving attribute of a driver may include the vehicle speed parameter, right-of-way yielding parameter, and overtaking driving parameter.

FIG. 5 is a diagram showing the information on the driving attribute of a driver. The first storage unit 34 stores the sex, age, excessive speed parameter, right-of-way yielding parameter, overtaking parameter, and the like in association with the driver ID. The excessive speed parameter is set based on the frequency at which the speed was exceeded and the vehicle speed that exceeded the speed limit. The right-of-way yielding parameter is set based on the number of times other vehicles were allowed to enter the lane ahead of the host vehicle from another lane and the number of times other vehicles were not allowed to enter the lane ahead of the host vehicle from another lane. The overtaking driving parameter is set based on the number of times the host vehicle was overtaken. The information on the driving attribute of a driver is composed of parameters indicating a plurality of types of driving tendency, with these parameters used for deriving the driving assistance information. A plurality of types of driving tendency of a driver, if set in this way, allows an agent to accurately predict the behavior of the driver corresponding to the traveling state, providing appropriate driving assistance information.

In the example shown in FIG. 5, the first vehicle 10 is used by a plurality of drivers, such as the members of a family, with the information on the driving attribute of each driver stored in the first storage unit 34. Each of the plurality of types of parameters is represented by a numerical value from 0 to 100, with a larger numerical value indicating a tendency of rougher driving. FIG. 5 indicates that the driver in the top row is rougher than the driver in the bottom row in any type of driving tendency; that is, the driver in the top row more easily exceeds the speed limit, is more reluctant to yield the right-of-way to another vehicle, and is less frequently overtaken.

The information on the driving attribute of the first driver may be derived based on the driving assistance information provided by the first agent 14 and on the speech and the driving result of the first driver who has received the driving assistance information. For example, assume that the first agent 14 has provided the first driver with the driving assistance information indicating "There is a merging vehicle from the right". In this case, if the first driver speaks that the other vehicle is not allowed to enter the lane ahead of the host vehicle or if the other vehicle was not allowed to enter the lane ahead of the host vehicle, the first attribute acquisition unit 32 updates the right-of-way yielding parameter in such a way that the parameter is increased. Conversely, if the first driver allowed another vehicle to enter the lane ahead of the host vehicle, the first attribute acquisition unit 32 updates the right-of-way yielding parameter in such a way that it is decreased. In this manner, the first agent 14 updates the parameters, which indicate the driving tendency, based on the first driver's action responsive to the driving assistance information provided by the first agent 14, for example, based on the first driver's response to the driving assistance information or based on the driving result.

Returning to FIG. 4, the estimation unit 60 acquires the destination information from the speech of the first driver and, from the destination information acquired in this way and the map information stored in the first storage unit 34, estimates the traveling schedule of the first vehicle 10. The estimation unit 60 can acquire the destination information, which is not set in the first navigation device 24, from the speech of the first driver. From the acquired destination information, the estimation unit 60 estimates the road on which the first vehicle 10 is scheduled to travel and the traveling lane which is determined according to whether the first vehicle 10 will turn right or left. The estimation unit 60 acquires the destination information from the first navigation device 24 when the destination information is set in the first navigation device 24 and estimates the traveling schedule of the first vehicle 10 from the destination information and the map information.

The estimation unit 60 acquires the information on the driving attribute of the first driver from the first storage unit 34 and, based on the information on the driving attribute of the first driver, estimates the traveling schedule of the first vehicle 10. For example, if the driver's driving tendency indicates that the driver drives gently, the estimation unit 60 estimates that the driver will continue to travel gently in the left lane on an expressway. Conversely, if the driver's driving tendency indicates that the driver drives roughly, the estimation unit 60 estimates that the driver will travel fast in the right lane on an expressway. In this way, based on driving attribute, the estimation unit 60 estimates the traveling lane as well as the time at which the driver will change the lane.

In addition, based on the information on the driving attribute of the first driver, the estimation unit 60 estimates whether to allow another vehicle to cut in or to overtake. For example, if the driver's driving tendency indicates that the driver drives gently, the estimation unit 60 estimates that the driver will allow another vehicle to cut in when driving slowly and that, if the driver's driving tendency indicates that the driver drives roughly, the estimation unit 60 estimates that the driver will not allow another vehicle to cut in.

The cooperation unit 62 identifies the information on the future driving of the first driver in the first vehicle 10 and sends the identified information on the future driving to the second agent 18. The information on the future driving of the first driver includes the information on the traveling schedule estimated by the estimation unit 60 and the information on the speech acquired by the user response unit 64, and includes the information on driving in the future. The information on the future driving of the first driver is the information that informs about the first driver's driving schedule in the surroundings of the first vehicle 10 and/or the second vehicle 12. The surroundings of the first vehicle 10 and/or the second vehicle 12 may be a range detectable by the first vehicle sensor 22 and/or the second vehicle sensor 42. That is, the information on the future driving is not the information on the traveling schedule for a distant future such as the destination information, but is the information on the host vehicle's traveling schedule related to the traveling of the other vehicles around the host vehicle, for example, the information on a traveling schedule for the near future such as "overtaking from now" or "changing the lane from now".

The information on the future driving estimated by the estimation unit 60 includes the information obtained by estimating from the driving attribute of the first driver, the information obtained by estimating the traveling schedule from a speech of the first driver, and the information obtained by estimating the traveling schedule from the destination information that is set in the first navigation device 24. The information on the future driving acquired by the user response unit 64 includes the information on the driving notified to the first driver, the information on the driving to be notified to the first driver, and the information on the driving approved by the first driver.

The cooperation unit 62 derives the driving assistance information based on the information on the traveling schedule of the second vehicle 12 acquired through cooperation with the second agent 18. For example, the cooperation unit 62 of the first agent 14 notifies the first driver about the driving assistance information that alerts the driver to overtaking such as the one shown in FIG. 2A. The cooperation unit of the second agent 18 notifies the second driver about the driving assistance information that prompts the driver to overtake such as the one as shown in FIG. 2B.

The first communication unit 16 sends the information on the driving attribute of the first driver and the information on the future driving to the second communication unit 20 and receives the information on the driving attribute of the second driver and the information on the future driving from the second communication unit 20.

Figure 6:
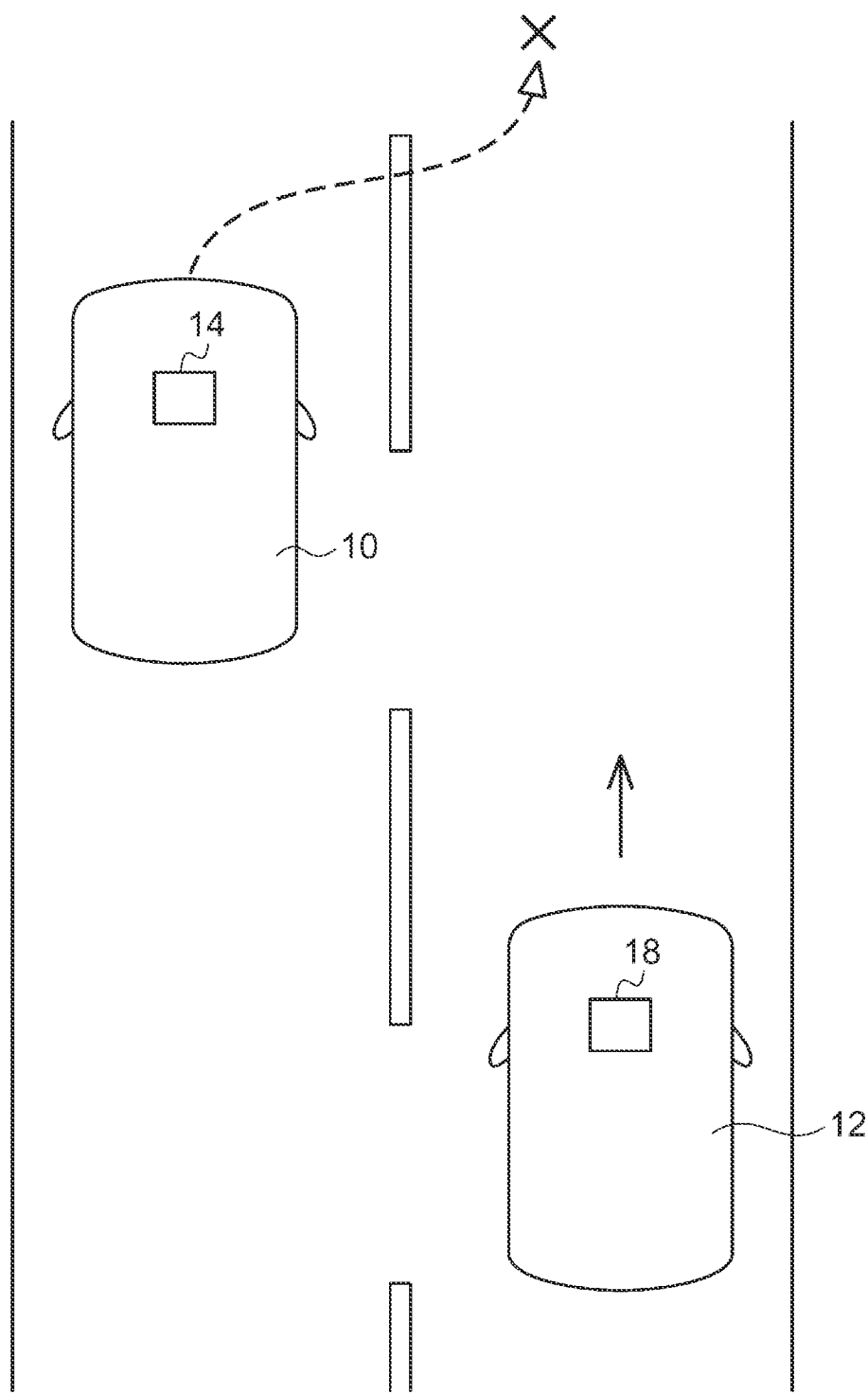
FIG. 6 is a diagram showing an example of driving assistance based on the information on the driving attribute of drivers acquired through cooperation among agents.

FIG. 6 is a diagram showing an example of driving assistance based on the information on the driving attribute of drivers acquired through cooperation among agents. In this example, the first driver first speaks that he or she wants to change the lane. Upon acquiring this speech, the first agent 14 acquires the information on the second vehicle 12, located around the first vehicle 10, from the detection result of the first vehicle sensor 22 and starts cooperation with the second agent 18. The first agent 14 may also acquire the position information on the second vehicle 12 via a server device.

The second agent 18 sends the driving attribute information on the second driver to the first agent 14, in which case the driving attribute information indicates that the driver is young and the driving tendency indicates that the driving is rough. Based on the driving attribute information on the second driver, the first agent 14 generates the driving assistance information. That is, based on the driving attribute of the second driver, the first agent 14 determines that it is not good for the first vehicle 10 to change the lane and move to a position ahead of the second vehicle 12, generates the driving assistance information recommending that the first vehicle 10 should not change the lane to move to a position ahead of the second vehicle 12, and notifies the first driver about the generated driving assistance information. In this way, the first agent 14 can assist the first driver in driving by sending an alert based on the driving attribute of the second driver.

In the traveling situation shown in FIG. 6, if the driving tendency of the second driver indicates that the driver drives gently, the first agent 14 determines that the first vehicle 10 may change the lane. In this case, based on this determination, the first agent 14 may send the driving assistance information to the first driver to indicate that the first vehicle 10 may change the lane.

Figure 7:
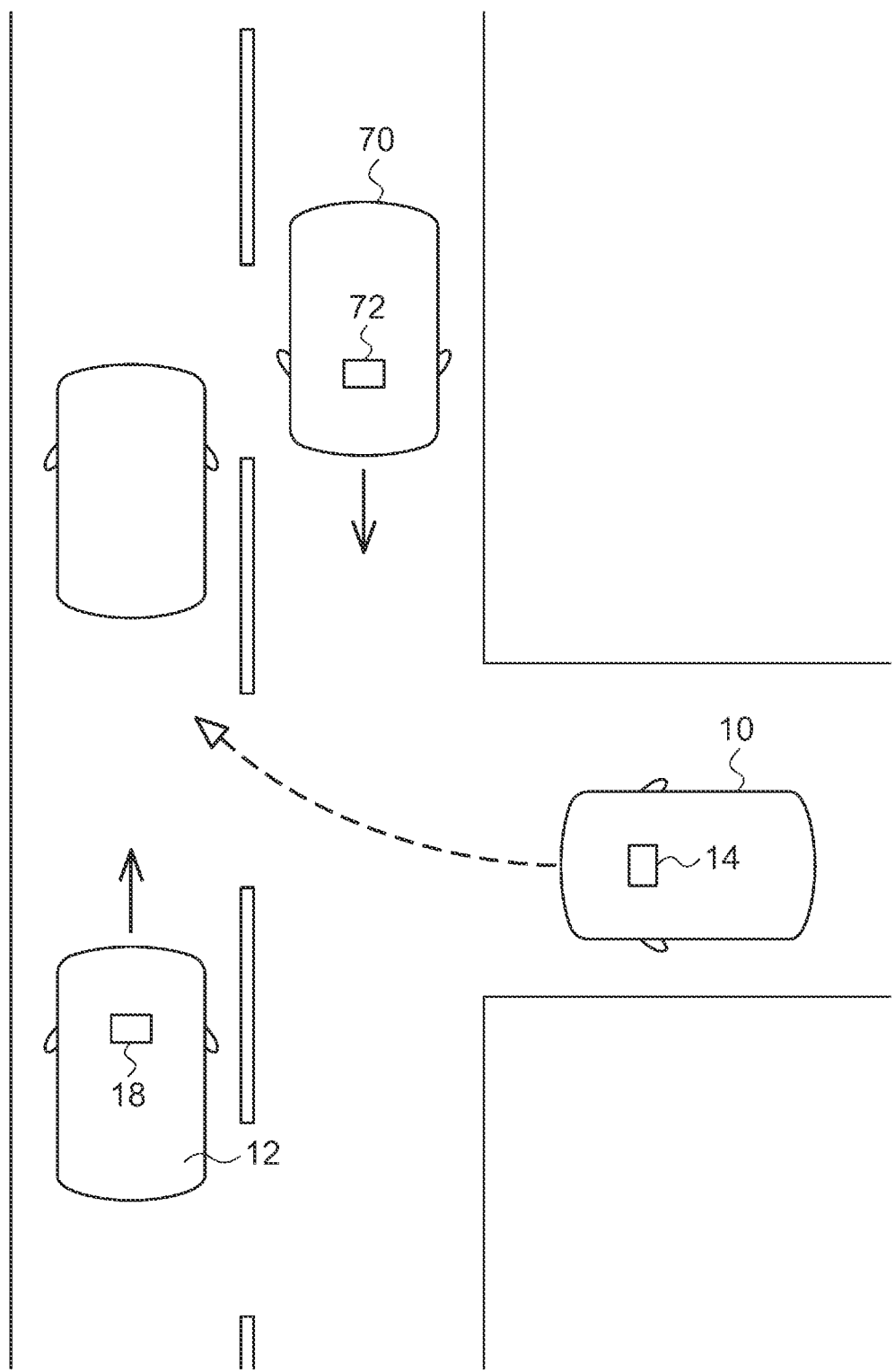
FIG. 7 is a diagram showing an example of driving assistance based on the information on the future driving of drivers acquired through cooperation among agents.

FIG. 7 is a diagram showing an example of driving assistance based on the information on the future driving of drivers acquired through cooperation among agents. In this example, the first vehicle 10 is going to turn right at the T-junction, and the first agent 14 acquires the position information on the second vehicle 12 and a third vehicle 70 from the detection result of the first vehicle sensor 22.

From the speech of the first driver, the first agent 14 estimates that the first vehicle 10 is going to turn right and sends the information, which indicates that the first vehicle 10 is going to turn right, to the second agent 18 and a third agent 72 as the information on the future driving.

The second agent 18 and the third agent 72 notify each driver that the first vehicle 10 is going to turn right. In response to this notice, the second driver speaks that the first vehicle 10 may cut in in front of the second vehicle 12 and the third driver speaks that the first vehicle 10 may cross the lane first. Based on the speech of the second driver, the second agent 18 sends the information, which indicates that the first vehicle 10 is allowed to turn right and the second vehicle 12 temporarily stops, to the first agent 14 as the information on future driving. Similarly, based on the speech of the third driver, the third agent 72 sends the information, which indicates that the first vehicle 10 is allowed to turn right and the third vehicle 70 temporarily stops, to the first agent 14 as the information on future driving.

The first agent 14 receives the information on the traveling schedule of the second vehicle 12 and the third vehicle 70, generates the driving assistance information indicating that the first vehicle 10 may immediately turn right, and notifies the first driver about the generated driving assistance information. Upon receiving the driving assistance information from the first agent 14, the first driver turns right and moves the first vehicle 10 in front of the second vehicle 12. In this way, the traveling schedule of each driver and the information sent by each agent to the driver for confirmation are exchanged among the agents and, to the driver of each vehicle, the information on the future driving of the other vehicles in the surroundings is sent for assisting the driver in driving. The information sent by each agent to the driver for confirmation is used also to generate the driving tendency of the driver.

Figure 8:
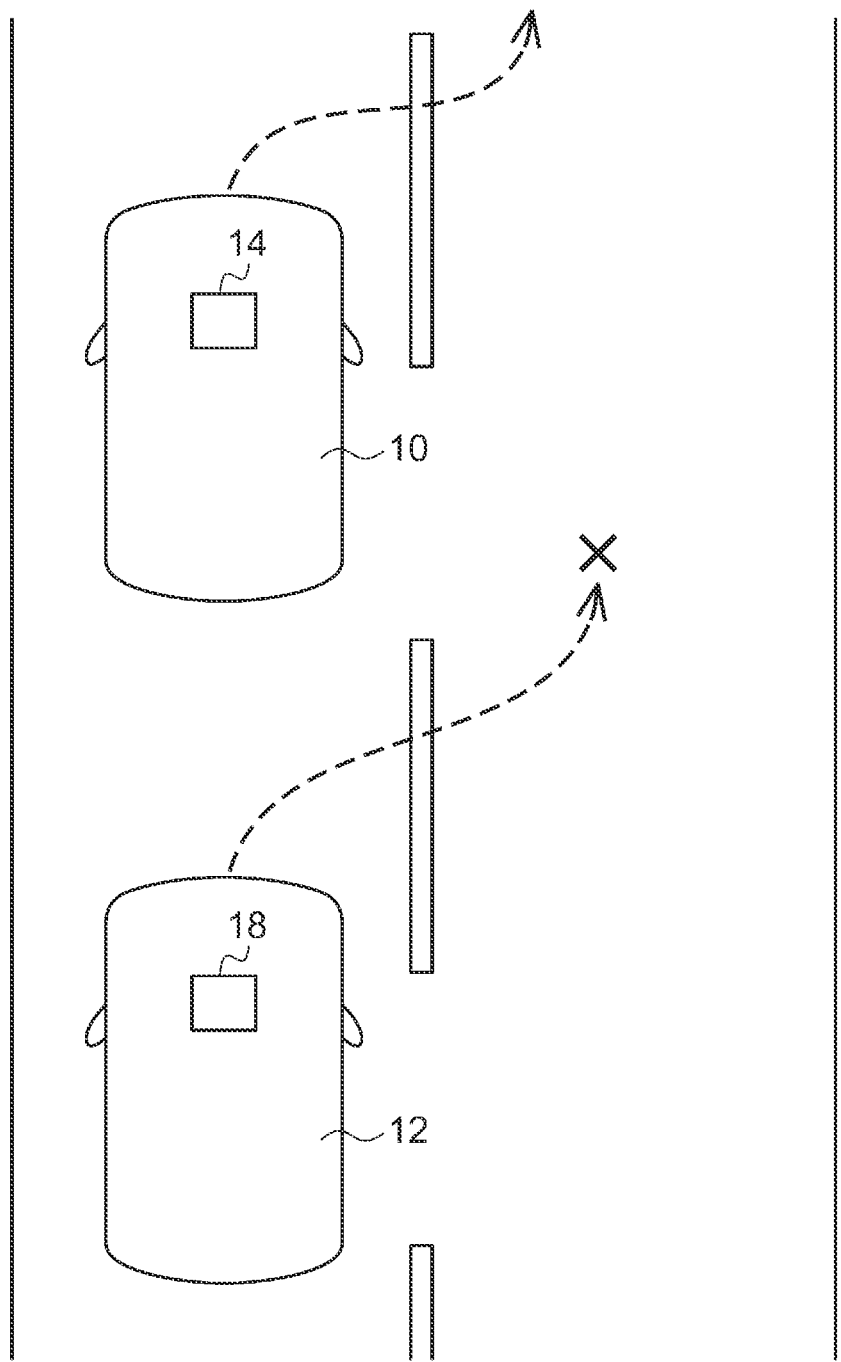
FIG. 8 is a diagram showing an example of driving assistance based on the information on the driving attribute of drivers acquired through cooperation among agents and the information on future driving.

FIG. 8 is a diagram showing an example of driving assistance based on the information on the driving attribute of drivers acquired through cooperation among agents and the information on future driving. The second agent 18 acquires the position information on the first vehicle 10 from the detection result of the second vehicle sensor 42 for cooperating with the first agent 14.

In this example, as the traveling schedule of the first driver, the first agent 14 acquires the information that the first vehicle 10 is going to change to the right lane. In addition, as the information on the driving attribute of the first driver, the first agent 14 acquires the information that the driving tendency indicates that the driving is gentle and that the first driver is in his/her sixties. Based on this information, the first agent 14 estimates that the first driver will change the lane earlier than a typical driver. The first agent 14 sends the information, which indicates that the first driver is going to change the lane, to the second agent 18 as the information on the future driving. Although the first agent 14 estimates the future driving of the first driver from the driving attribute and the traveling schedule of the first driver in this example, the present disclosure is not limited to this mode; instead, the second agent 18 may receive the driving attribute and the traveling schedule of the first driver and estimate the future driving of the first driver.

Upon receiving the traveling schedule of the first driver, the second agent 18 notifies the second driver not to overtake the first vehicle 10. This notification allows the second driver to drive carefully so that the second vehicle 12 will not overtake the first vehicle 10.

This embodiment is merely an example and it is to be understood by those skilled in the art that various modifications are possible by combining the components and that such modifications are also within the scope of the present disclosure.

In the embodiment, though the first agent 14 and the second agent 18 assist a driver in driving by notifying the driver about the driving assistance information, the present disclosure is not limited to this mode. For example, at least one of the first vehicle 10 and the second vehicle 12 may be in autonomous driving mode, and the information on the future driving of the other vehicle, acquired through cooperation between the first agent 14 and the second agent 18, may be used for autonomous driving control of the host vehicle.

The autonomous driving control unit performs the control shown in FIG. 7, that is, the control for causing the first vehicle 10 to turn right and the control for causing the second vehicle 12 to temporarily stop, based on the information on the future driving of the other vehicles acquired through cooperation between agents. Using the information on the future driving of the other vehicles, acquired through cooperation between agents, for autonomous driving control in this way allows the traveling schedule of the other vehicles to be identified, thus ensuring safe control.

What is claimed is:
1. An agent cooperation system comprising:
a first agent configured to acquire information on a driving attribute of a first driver in a first vehicle;
a first attribute acquisition unit configured to acquire a driving tendency of the first driver based on past driving history of the first driver and to classify the driving tendency of the first driver into a plurality of levels indicating a gentleness of driving of the first driver based on the past driving history; and
a second agent in a second vehicle configured to receive speech of a second driver in the second vehicle indicating that the second vehicle is going to overtake the first vehicle, and transmit a traveling schedule of the second vehicle to the first agent in the first vehicle indicating that the second vehicle is going to overtake the first vehicle; wherein
the first agent is configured to receive speech of the first driver in the first vehicle indicating that overtaking the first vehicle is allowed, and transmit an indication that overtaking is allowed to the second agent in the second vehicle; and
the second agent is configured to notify the second driver about driving assistance information derived based on the traveling schedule of the second vehicle.

2. The agent cooperation system according to claim 1, wherein
the first agent is configured to generate the information on the driving attribute of the first driver based on a speech of the first driver.

3. The agent cooperation system according to claim 1, wherein
the second agent is configured to notify the second driver about the driving assistance information derived based on a traveling schedule of the first driver, the traveling schedule of the first driver being estimated from the information on the driving attribute of the first driver.

4. The agent cooperation system according to claim 1, wherein
the first agent is configured to identify information on future driving of the first driver, and the second agent is configured to notify the second driver about the driving assistance information derived based on the driving attribute of the first driver identified by the first agent and on the information on the future driving of the first driver.

5. The agent cooperation system according to claim 1, wherein
the information on the driving attribute of the first driver includes a plurality of types of parameters, and the second agent is configured to
derive the driving assistance information based on at least one of the plurality of types of parameters, and
notify the second driver about the driving assistance information.

6. The agent cooperation system according to claim 1, wherein
the information on the driving attribute of the first driver is updated by an action of the first driver responsive to the driving assistance information provided from the first agent.

7. An agent cooperation method comprising:
cooperating between a first agent mounted in a first vehicle and a second agent mounted in a second vehicle;
acquiring, by the first agent, information on a driving attribute of a first driver in the first vehicle;
acquiring a driving tendency of the first driver based on past driving history of the first driver;
classifying the driving tendency of the first driver into a plurality of levels indicating a gentleness of driving of the first driver based on the past driving history;
receiving, by the second agent in the second vehicle, speech of a second driver in the second vehicle indicating that the second vehicle is going to overtake the first vehicle;
transmitting, by the second agent, a traveling schedule of the second vehicle to the first agent indicating that the second vehicle is going to overtake the first vehicle;
receiving, by the first agent, speech of the first driver in the first vehicle indicating that overtaking the first vehicle is allowed;
transmitting, by the first agent to the second agent, an indication that overtaking is allowed; and
notifying, by the second agent, the second driver in the second vehicle about driving assistance information derived based on the traveling schedule of the second vehicle.

8. A non-transitory storage medium storing
information on a driving attribute of a first driver in a first vehicle; and
information on a driving tendency of the first driver comprising a classification of the driving tendency into a plurality of levels indicating a gentleness of driving of the first driver based on the past driving history, wherein
the information on the driving attribute is acquired by a first agent mounted in the first vehicle in a form of a plurality of types of parameters;
a second agent in a second vehicle receives speech of a second driver in the second vehicle indicating that the second vehicle is going to overtake the first vehicle;
the second agent transmits a traveling schedule of the second vehicle to the first agent in the first vehicle indicating that the second vehicle is going to overtake the first vehicle;
the first agent receives speech of the first driver in the first vehicle indicating that overtaking the first vehicle is allowed;
the first agent transmits, to the second agent, an indication that overtaking is allowed; and
the second agent notifies the second driver about driving assistance information derived based on the traveling schedule of the second vehicle.

9. An agent cooperation method comprising:
cooperating between a first agent mounted in a first vehicle and a second agent mounted in a second vehicle;
acquiring, by the first agent, information on a driving attribute of a first driver in the first vehicle;
acquiring a driving tendency of the first driver based on past driving history of the first driver;
classifying the driving tendency of the first driver into a plurality of levels indicating a gentleness of driving of the first driver based on the past driving history;
sending the information on the driving attribute of the first driver and the classification of the driving tendency of the first driver to the second agent in such a way that the second agent can receive the information;
receiving, by the second agent in the second vehicle, speech of a second driver in the second vehicle indicating that the second vehicle is going to overtake the first vehicle;
transmitting, by the second agent, a traveling schedule of the second vehicle to the first agent indicating that the second vehicle is going to overtake the first vehicle;
receiving, by the first agent, speech of the first driver in the first vehicle indicating that overtaking the first vehicle is allowed;
transmitting, by the first agent to the second agent, an indication that overtaking is allowed; and
notifying, by the second agent, the second driver in the second vehicle about driving assistance information derived based on the traveling schedule of the second vehicle.

10. An agent cooperation method comprising:
cooperating between a first agent mounted in a first vehicle and a second agent mounted in a second vehicle;
receiving information on a driving attribute of a first driver in the first vehicle acquired by the first agent;
receiving a classification of a driving tendency of the first driver, the classification comprising a plurality of levels indicating a gentleness of driving of the first driver based on past driving history of the first driver;

receiving, by the second agent in the second vehicle, speech of a second driver in the second vehicle indicating that the second vehicle is going to overtake the first vehicle;

transmitting, by the second agent, a traveling schedule of the second vehicle to the first agent indicating that the second vehicle is going to overtake the first vehicle;

receiving, by the first agent, speech of the first driver in the first vehicle indicating that overtaking the first vehicle is allowed;

transmitting, by the first agent to the second agent, an indication that overtaking is allowed; and notifying, by the second agent, the second driver in the second vehicle about driving assistance information derived based on the traveling schedule of the second vehicle.

11. The agent cooperation system according to claim 1, wherein the first agent is mounted in the first vehicle and the second agent is mounted in the second vehicle.

* * * * *